US008060292B2

(12) United States Patent
Takahashi et al.

(10) Patent No.: US 8,060,292 B2
(45) Date of Patent: Nov. 15, 2011

(54) CETANE NUMBER DETECTION MEANS AND ENGINE HAVING THE CETANE NUMBER DETECTION MEANS

(75) Inventors: Takeshi Takahashi, Osaka (JP); Terumitsu Takahata, Osaka (JP); Hidenori Nomura, Osaka (JP); Gou Asai, Osaka (JP); Yukihiro Shinohara, Aichi (JP); Keiji Ooshima, Aichi (JP); Toshiro Itatsu, Aichi (JP)

(73) Assignees: Yanmar Co., Ltd., Osaka (JP); Toyota Jidosha Kabushiki Kaisha, Aichi (JP)

( * ) Notice: Subject to any disclaimer, the term of this patent is extended or adjusted under 35 U.S.C. 154(b) by 377 days.

(21) Appl. No.: 12/303,053

(22) PCT Filed: Apr. 19, 2007

(86) PCT No.: PCT/JP2007/058541
§ 371 (c)(1),
(2), (4) Date: May 1, 2009

(87) PCT Pub. No.: WO2007/141964
PCT Pub. Date: Dec. 13, 2007

(65) Prior Publication Data
US 2010/0030453 A1 Feb. 4, 2010

(30) Foreign Application Priority Data

Jun. 2, 2006 (JP) ................................ 2006-155086

(51) Int. Cl.
*B60T 7/12* (2006.01)

(52) U.S. Cl. .......... 701/104; 123/1 A; 123/434; 123/478
(58) Field of Classification Search .......... 701/103–105, 701/114, 115; 123/1 A, 305, 434, 436, 704, 123/478, 480, 445
See application file for complete search history.

(56) References Cited

U.S. PATENT DOCUMENTS

| | | | | |
|---|---|---|---|---|
| 3,575,146 | A * | 4/1971 | Creighton et al. | 123/299 |
| 4,852,529 | A * | 8/1989 | Vowles | 123/143 B |
| 7,401,591 | B2 * | 7/2008 | Yamaguchi et al. | 123/299 |
| 7,480,557 | B2 * | 1/2009 | Yamaguchi et al. | 701/104 |
| 7,673,618 | B2 * | 3/2010 | Hasegawa et al. | 123/435 |

FOREIGN PATENT DOCUMENTS

| | | |
|---|---|---|
| JP | 09-324676 | 12/1997 |
| JP | 2004-340026 | 12/2004 |
| JP | 2005-048703 | 2/2005 |
| JP | 2005-240757 | 9/2005 |
| JP | 2005-344557 | 12/2005 |
| JP | 2006-016994 | 1/2006 |

OTHER PUBLICATIONS

International Search Report for PCT/JP2007/058541, the Japanese Patent Office, mailed May 15, 2007, 2 pgs.

* cited by examiner

*Primary Examiner* — John Kwon
(74) *Attorney, Agent, or Firm* — Sterne, Kessler, Goldstein & Fox P.L.L.C.

(57) ABSTRACT

A cetane number detection device in which an angular velocity detection device (10) for detecting the rotation angular velocity of the crankshaft (11) of an engine (54), and which detects a variation in the value of the amplitude of the angular velocity detected by the angular velocity detection device (10) as a variation in cetane number.

12 Claims, 12 Drawing Sheets

(a)

(b)

CETANE NUMBER DETECTION MEANS AND ENGINE HAVING THE CETANE NUMBER DETECTION MEANS

BACKGROUND OF THE INVENTION

1. Field of the Invention

The present invention relates to an art that variation of cetane number is calculated (estimated) from the angular velocity amplitude of engine rotation so as to correct fuel injection when the cetane number is varied.

2. Background Art

Light oil which is a fuel of a diesel engine is produced and sold at world nations while cetane number of the light oil is varied within the range of 38 to 52. Since light oil used for a diesel engine is measured strictly and then sold, the cetane number of the light oil should always be uniform. However, for example, fuel of a different cetane number may be supplied to a ship at a port of call. Especially, the cetane number of coarse light oil may decrease.

Fuel injection control of a diesel engine is based on the nominal value of the cetane number of the fuel used at the time of production. Then, when the cetane number is not uniform or decreases, appropriate fuel injection control cannot be performed.

In consideration of the background, conventionally, several methods for detecting variation of cetane number have been performed. For example, Patent Literature 1 discloses an art for detecting cetane number at the time of fuel-cutting of an internal-combustion engine.

However, the cetane number of fuel used for driving may be changed by using the status of the fuel or the number of fuel supply, whereby it is preferable to detect variation of cetane number regularly. Conventionally, there is no method for detecting variation of cetane number which can be performed regularly while driving an internal-combustion engine.

Patent Literature 1: the Japanese Patent Laid Open Gazette 2005-344557

BRIEF SUMMARY OF THE INVENTION

Problems to Be Solved by the Invention

The purpose of the invention is to detect regularly a variation of cetane number of fuel while driving an internal-combustion engine and to control fuel injection appropriately based on the detected variation of cetane number.

Means for Solving the Problems

The above-mentioned problems are solved by the following means.

According to the present invention, an angular velocity detection means detecting rotation angular velocity of a crankshaft of an engine is provided; angular velocity amplitude which is a standard of judgment of cetane number is set based on engine rotation speed and fuel injection amount; and the variation of angular velocity amplitude obtained by the angular velocity detection means is compared with the standard value so as to detect the variation of cetane number.

According to the present invention, an engine comprises a load detection means detecting engine load; an engine rotation speed detection means detecting engine rotation speed; a fuel injection calculation means calculating at least one of: the fuel injection amount, the number of the fuel injection and the fuel injection pressure for standard fuel based on the load detected by the load detection means and the rotation speed detected by the engine rotation speed detection means; and a fuel injection correction means correcting the fuel injection amount when the fuel injection amount is calculated, the number of fuel injection when the number of the fuel injection is calculated, and the fuel injection pressure when the fuel injection pressure is calculated, based on the cetane number detected by the cetane number detection means.

According to the present invention, the engine comprises a multistage fuel injection means performing at least one injection before the main injection, a multistage fuel injection calculation means calculating at least one of: the injection timing or an injection interval of the multistage fuel injection means for the standard fuel; and a multistage fuel injection correction means correcting the fuel injection timing when the fuel injection timing is calculated, and the fuel injection interval when the fuel injection interval is calculated, based on the cetane number detected by the cetane number detection means.

According to the present invention, the multistage fuel injection correction means shortens the interval between the main injection and the injection just before the main injection when the cetane number detected by the cetane number detection means is decreased.

According to the present invention, the correction by the fuel injection correction means or the multistage fuel injection correction means is performed at the time of starting the engine.

According to the present invention, the engine comprises a maximum fuel injection amount correction means correcting the maximum fuel injection amount determined based on the fuel injection amount corrected by the fuel injection correction means or the cetane number detected by the cetane number detection means.

According to the present invention, the engine comprises a supercharger; at least one of: an oxygen concentration sensor, an exhaust temperature sensor and a turbocharger rotation speed sensor; and a maximum fuel injection amount correction confirmation control means that judges when the maximum fuel injection amount corrected by the maximum fuel injection amount correction means is normal when the oxygen concentration detected by the oxygen concentration sensor, the exhaust temperature detected by the exhaust temperature sensor or the turbocharger rotation speed detected by the turbocharger rotation speed sensor is within a predetermined threshold.

According to the present invention, the engine comprises a variable capacity supercharger which can vary back pressure or supercharging pressure; and a supercharging pressure control means controlling the back pressure or the supercharging pressure of the variable capacity supercharger based on the cetane number detected by the cetane number detection means.

Effect of the Invention

The present invention brings the following effects.

According to the present invention, angular velocity amplitude is varied following the variation of cetane number so that the cetane number can be detected regularly.

According to the present invention, the fuel injection is corrected following the variation of the cetane number so as to optimize the combustion. Variation of engine characteristics or variation of exhaust emission caused by the variation of the cetane number is minimized.

According to the present invention, the multistage fuel injection is corrected following the variation of the cetane number so as to optimize the combustion of the multistage fuel injection such as the pilot injection. Combustion noise or rise of pressure in cylinders caused by the variation of the cetane number is minimized.

According to the present invention, worsening of ignitability caused by the decrease of the cetane number is minimized.

According to the present invention, the cetane number is detected only at the time of starting the engine and the fuel injection of the multistage injection is corrected. Accordingly, in addition to the effect of claim 3, the engine is started after supplying fuel so as to detect whether the cetane number is varied or not at the time of starting the engine. Compared with the case of performing detection and calculation always, the burden is reduced so that a processor (CPU) can be used another calculation.

According to the present invention, the maximum fuel injection amount is corrected following the variation of the cetane number so as to correct the fuel injection certainly throughout the area of load. The rated output is guaranteed regardless of the effect of the variation of the cetane number.

According to the present invention, the reliability of the engine is improved. It is checked whether the corrected maximum fuel injection amount is normal or not and the fuel injection of the engine is controlled speedily even in a case when the corrected fuel amount is not normal.

According to the present invention, supercharging pressure or back pressure is corrected following the variation of the cetane number so as to optimize the combustion. Turbo surge and the like are prevented.

BRIEF DESCRIPTION OF THE DRAWINGS/FIGURES

DETAILED DESCRIPTION OF THE INVENTION

Next, an explanation will be given on an embodiment of the present invention.

Figure 1:
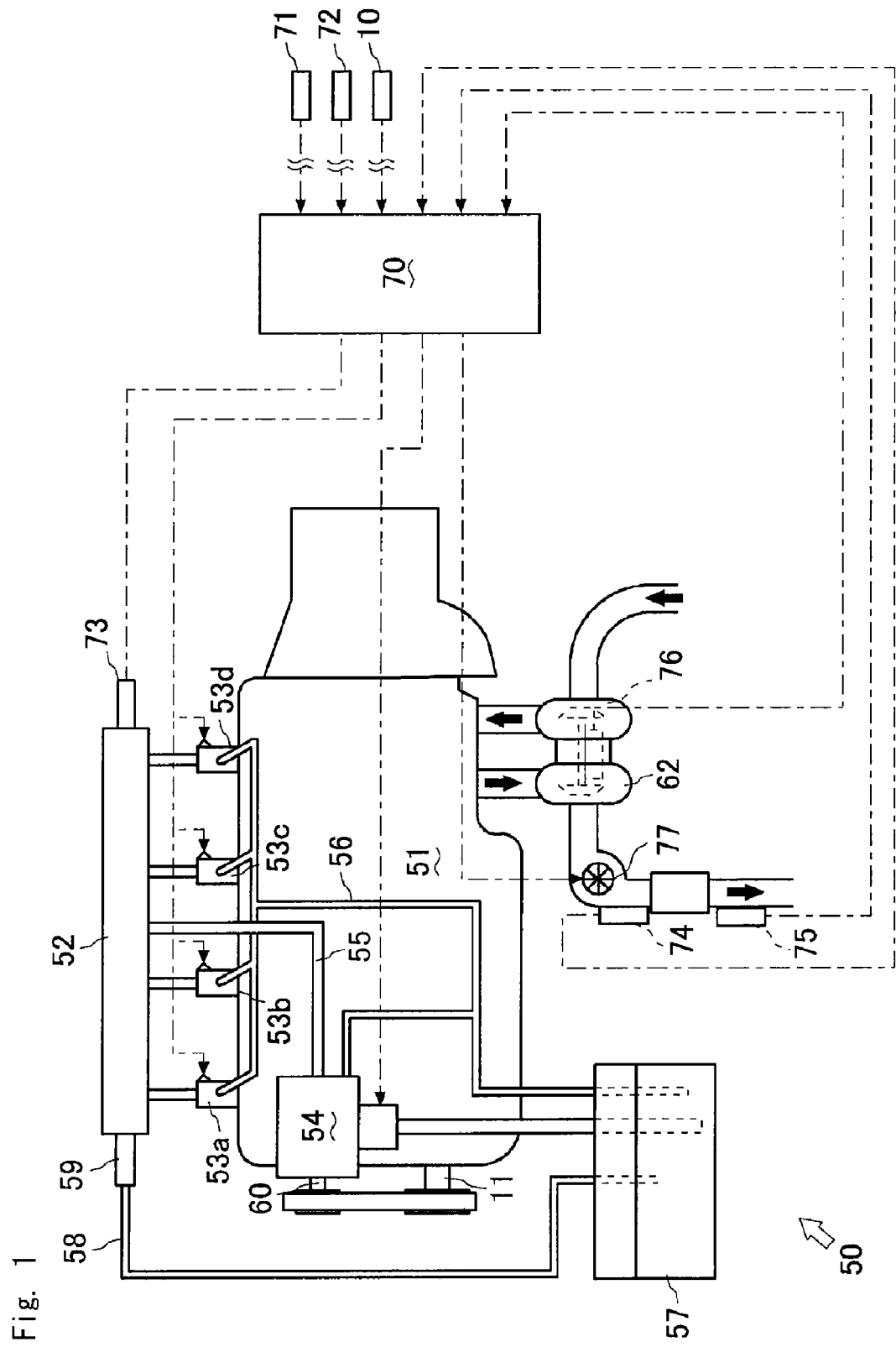
FIG. 1 is a drawing of an entire construction of a 4-cylinder diesel engine according to an embodiment of the present invention.
Figure 2:
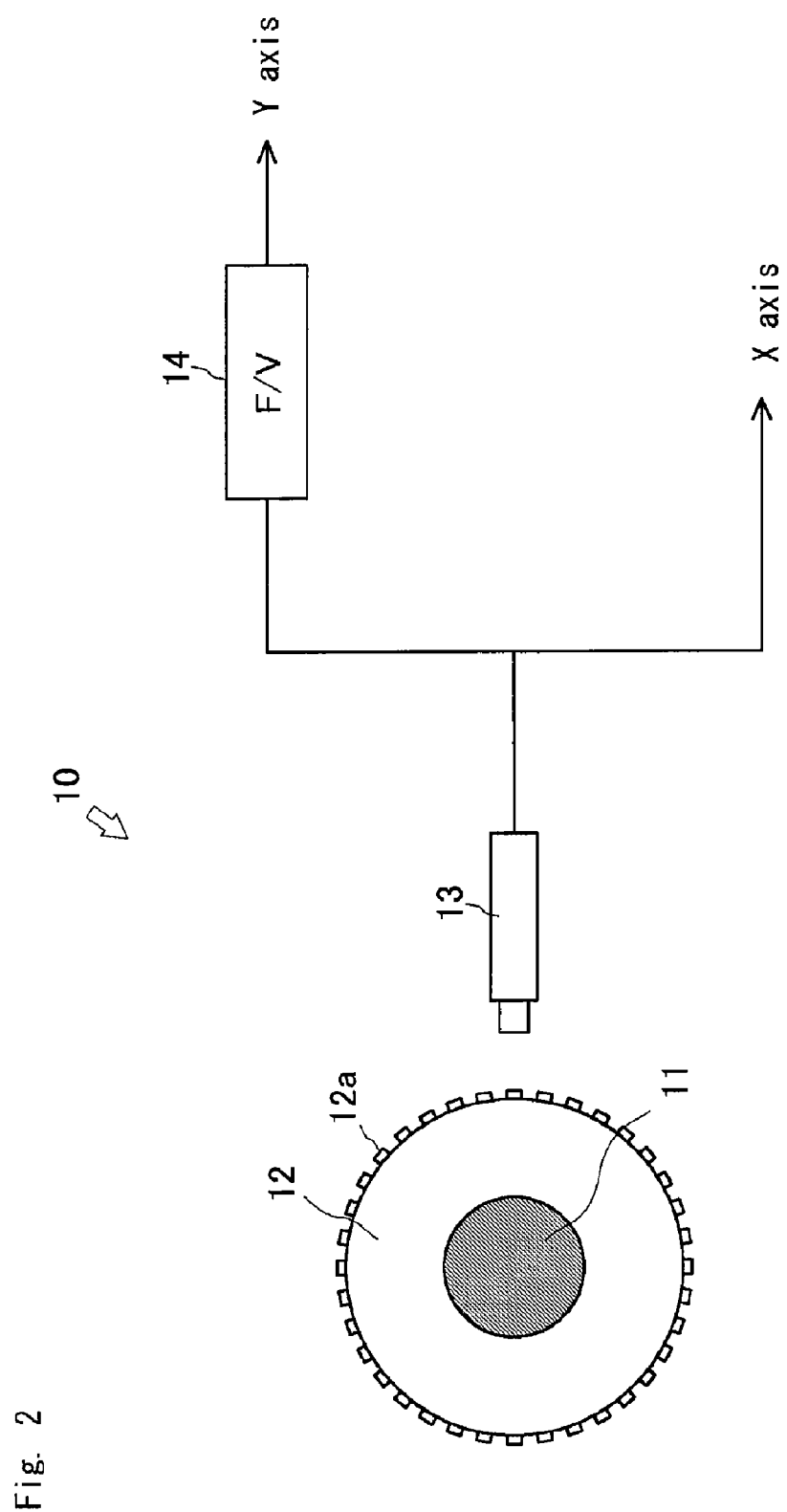
FIG. 2 is a graph of engine rotation angular velocity corresponding to engine rotation.
Figure 3:
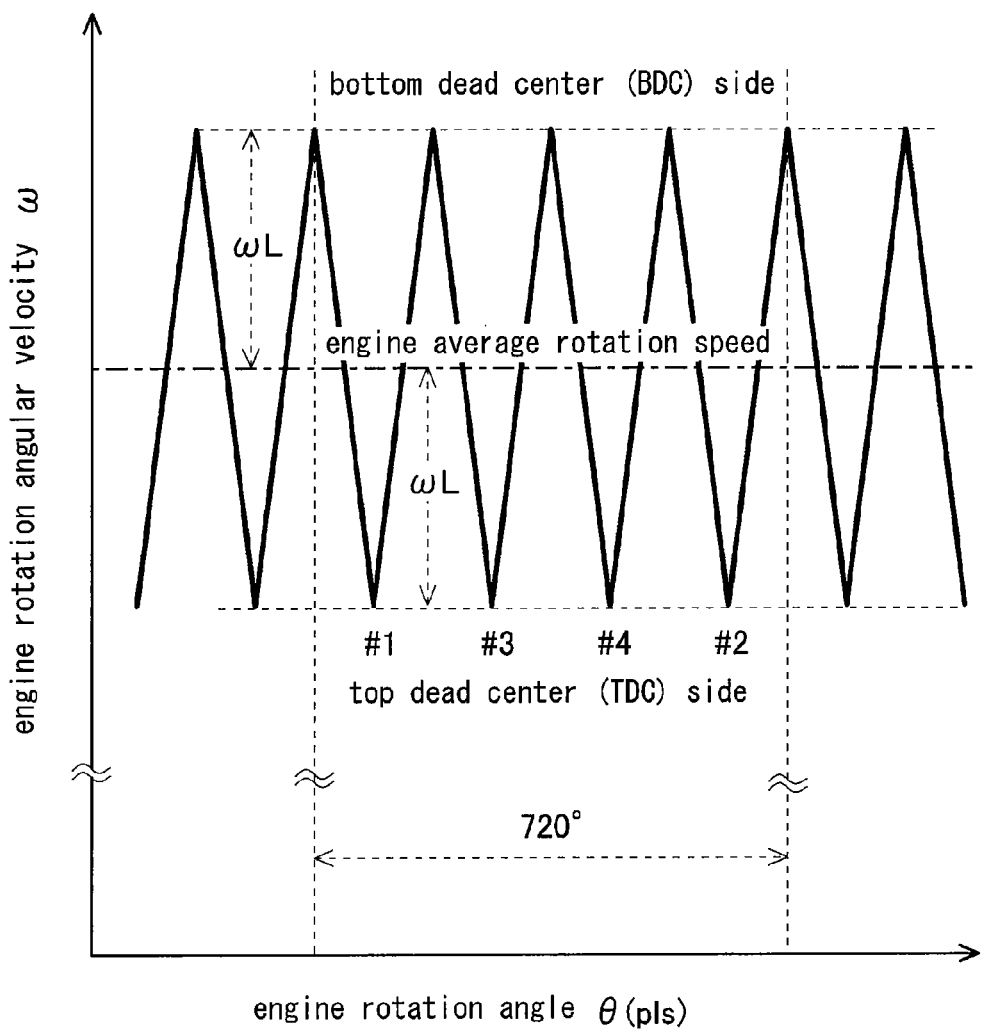
FIG. 3 is a graph of engine rotation angular velocity corresponding to an angle of engine rotation of fuel of different cetane numbers.

FIG. 1 is a drawing of an entire construction of a 4-cylinder diesel engine according to an embodiment of the present invention. FIG. 2 is a graph of engine rotation angular velocity corresponding to engine rotation. FIG. 3 is a graph of engine rotation angular velocity corresponding to an angle of engine rotation of fuels of different cetane numbers.

Figure 4:
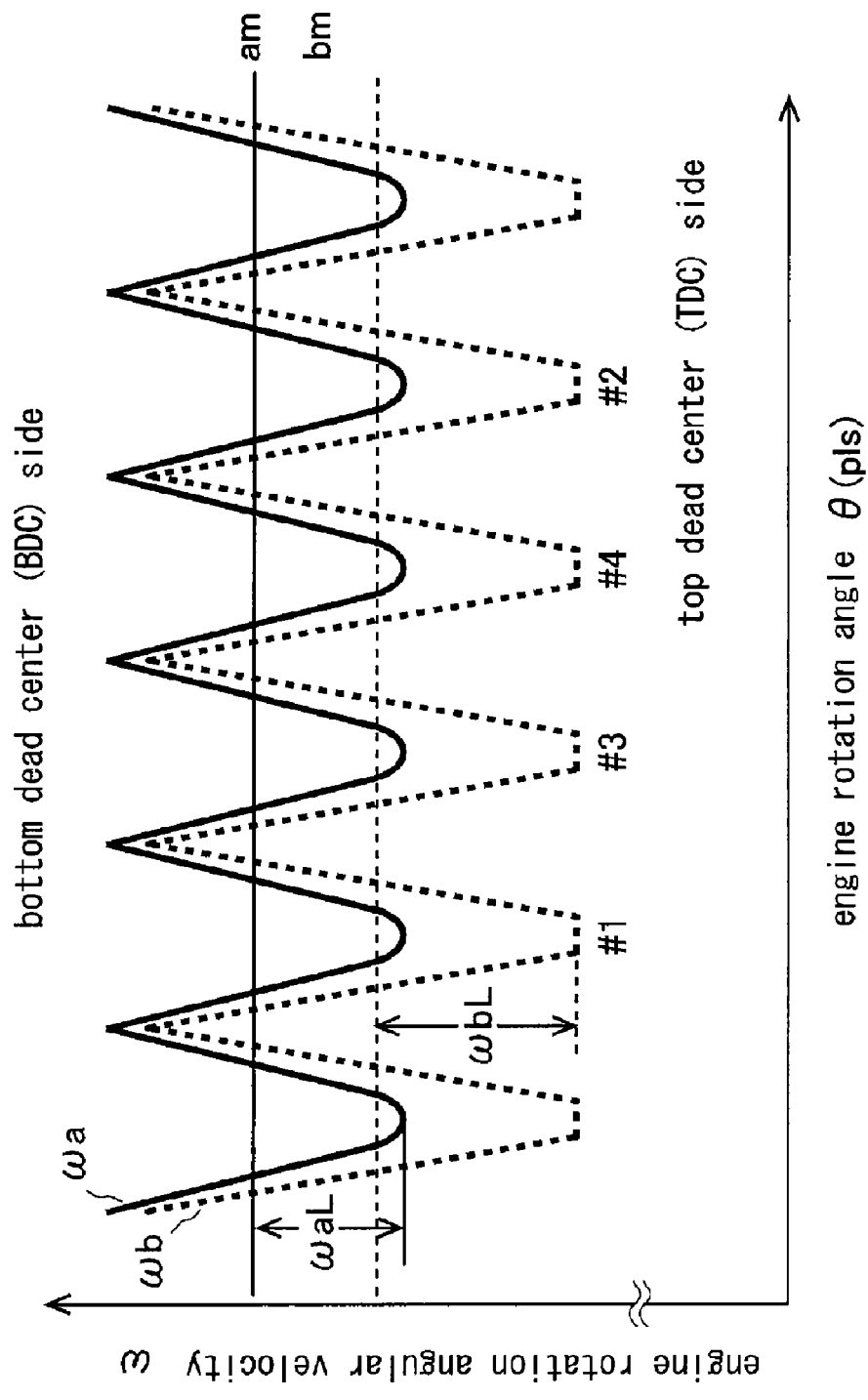
FIG. 4 is a drawing of an entire construction of a 4-cylinder diesel engine according to an embodiment of the present invention.
Figure 5:
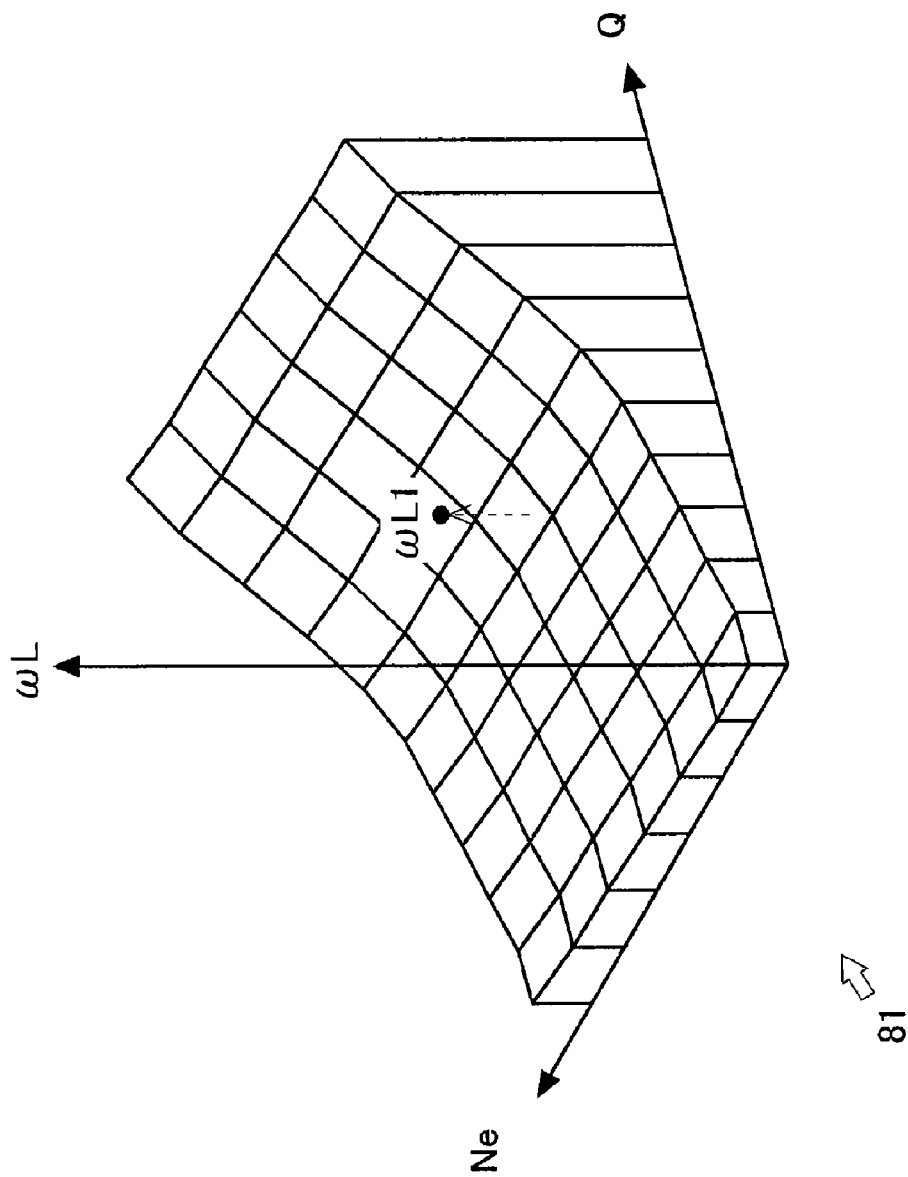
FIG. 5 is an angular velocity amplitude map of the appropriate angular velocity amplitude calculated based on rotation speed Ne and injection amount Q.
Figure 6:
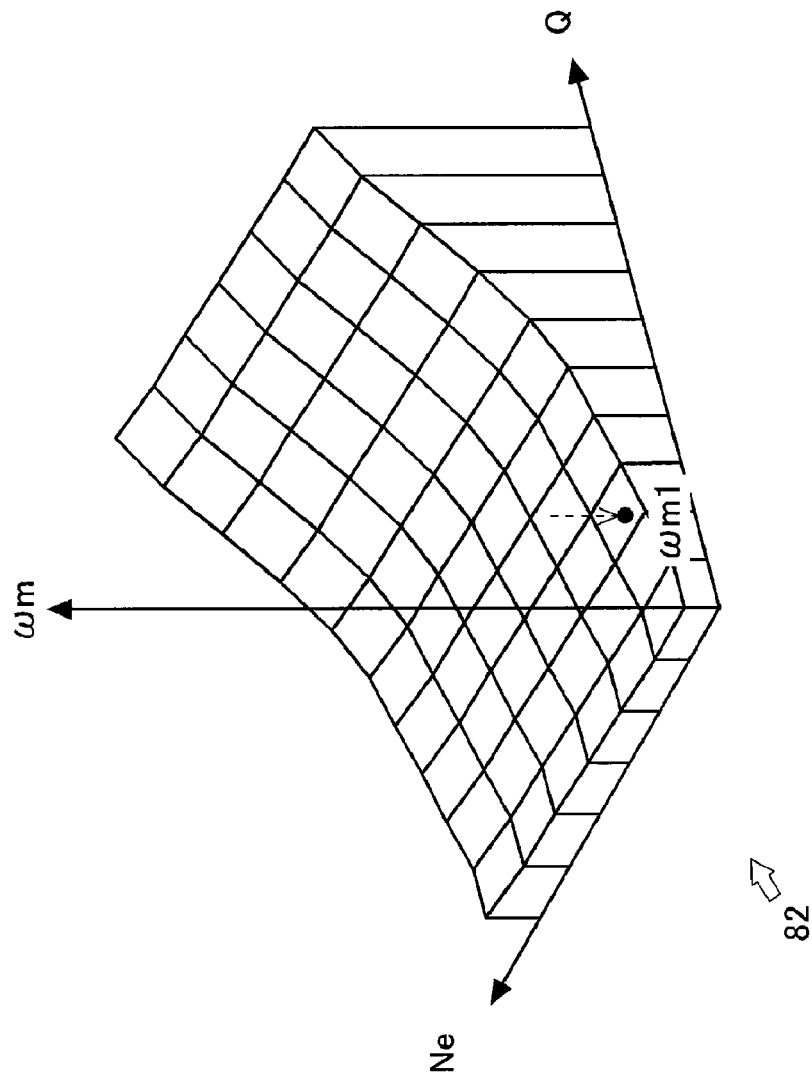
FIG. 6 is an average angular velocity map of the appropriate average angular velocity calculated based on rotation speed Ne and injection amount Q.

FIG. 4 is a drawing of an entire construction of a 4-cylinder diesel engine according to an embodiment of the present invention. FIG. 5 is an angular velocity amplitude map of the appropriate angular velocity amplitude calculated based on rotation speed Ne and injection amount Q. FIG. 6 is an average angular velocity map of the appropriate average angular velocity calculated based on rotation speed Ne and injection amount Q.

Figure 7:
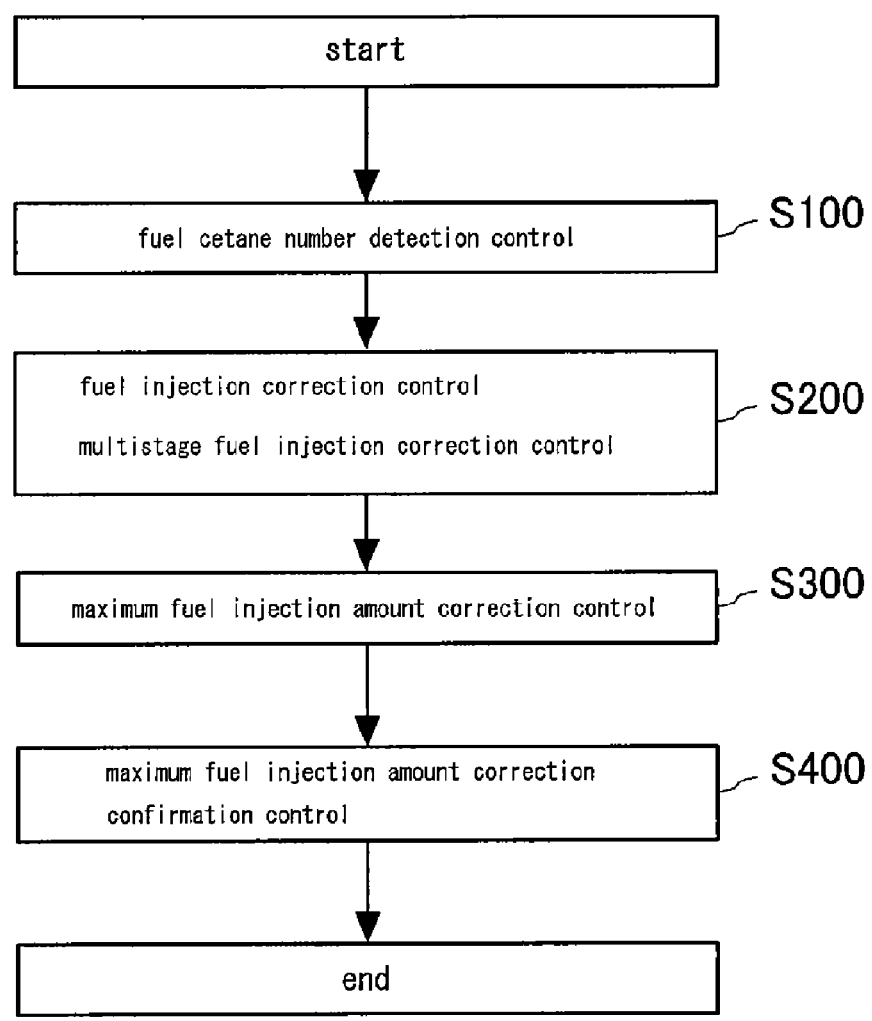
FIG. 7 is a flow chart of a main flow of fuel injection control according to an embodiment of the present invention.
Figure 8:
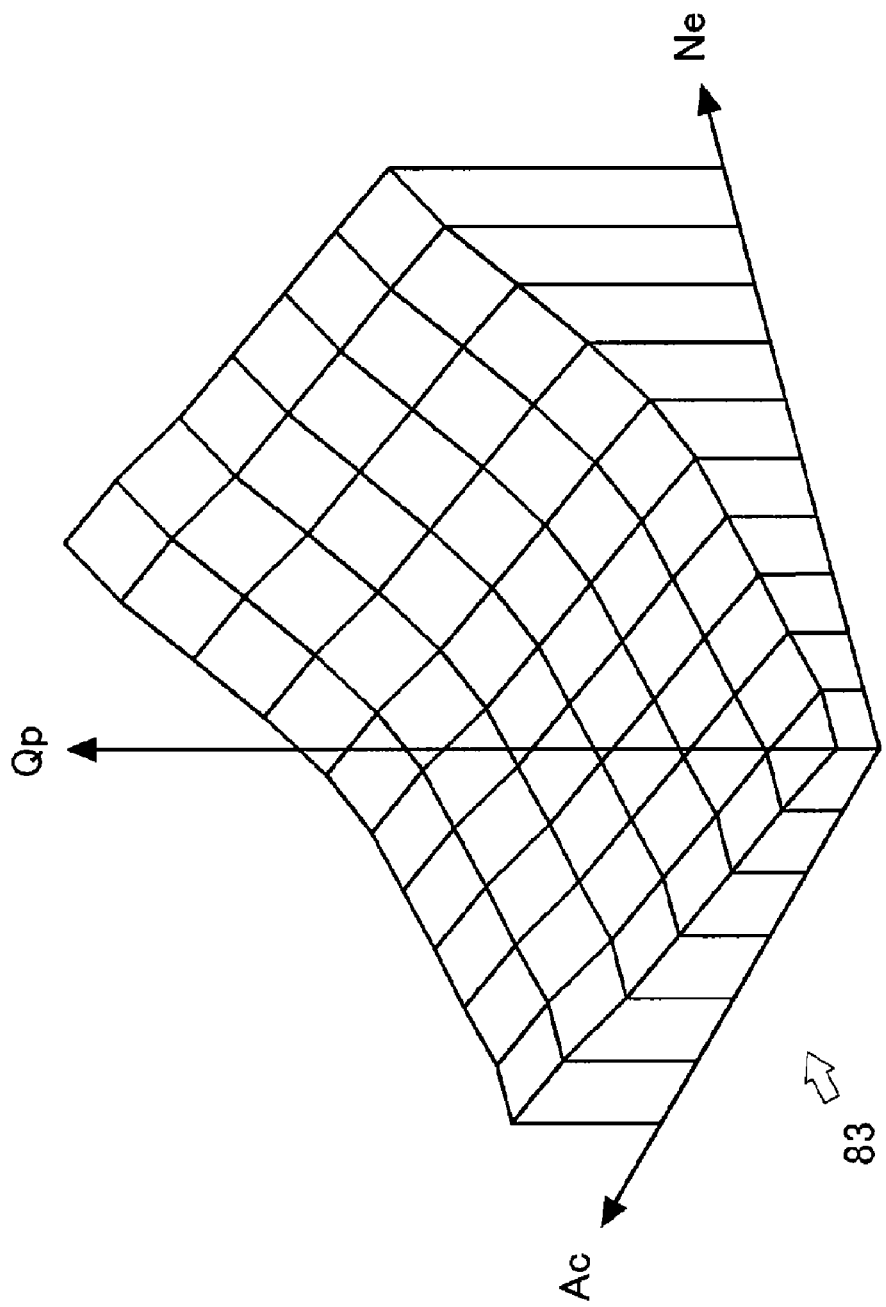
FIG. 8 is a fuel injection pressure map of fuel injection pressure Qp calculated based on rotation speed Ne and load Ac.
Figure 9:
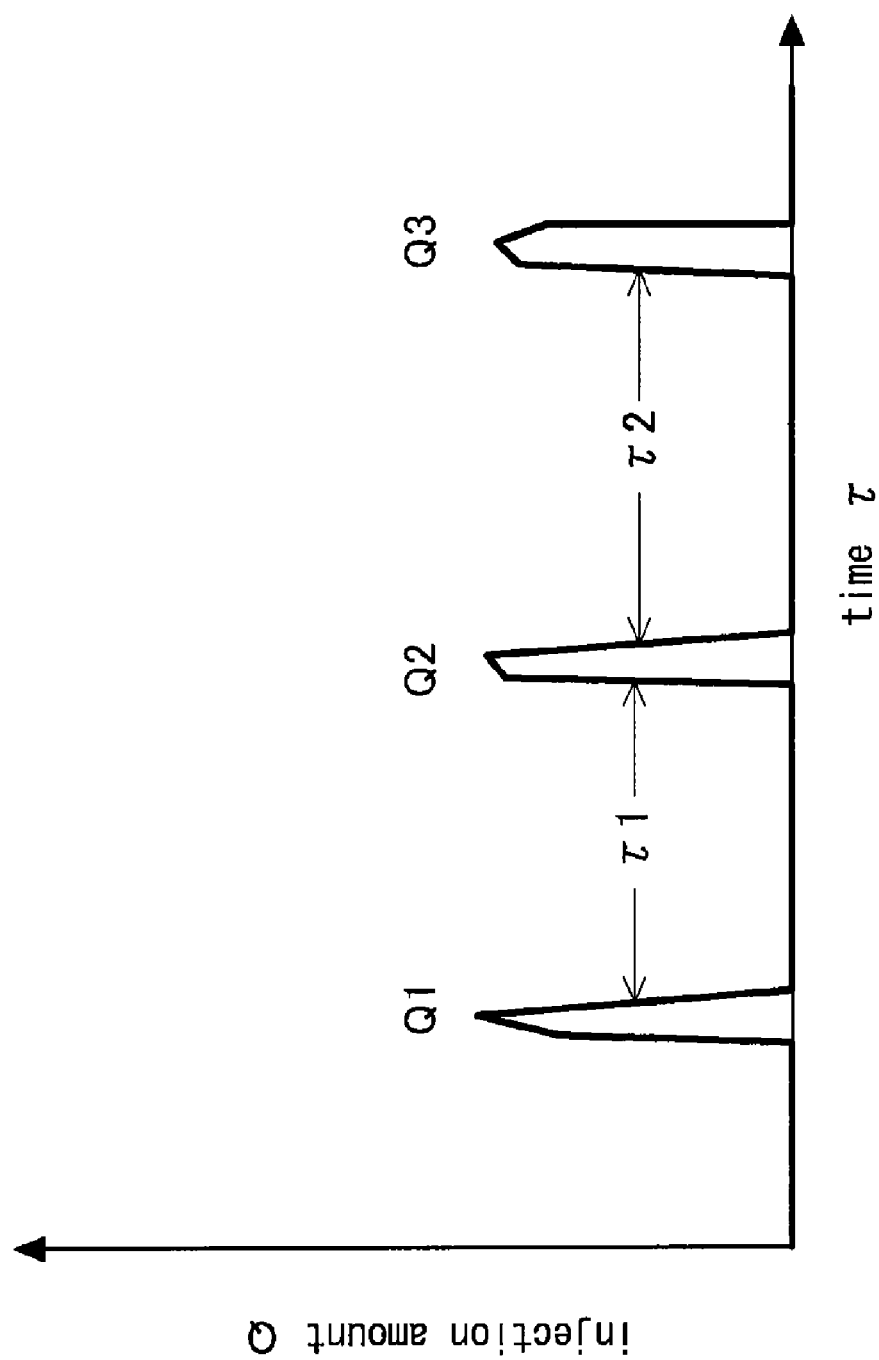
FIG. 9 is a graph of a multistage fuel injection according to an embodiment of the present invention.

FIG. 7 is a flow chart of a main flow of fuel injection control according to an embodiment of the present invention. FIG. 8 is a fuel injection pressure map of fuel injection pressure Qp calculated based on rotation speed Ne and load Ac. FIG. 9 is a graph of the multistage fuel injection according to an embodiment of the present invention.

Figure 10:
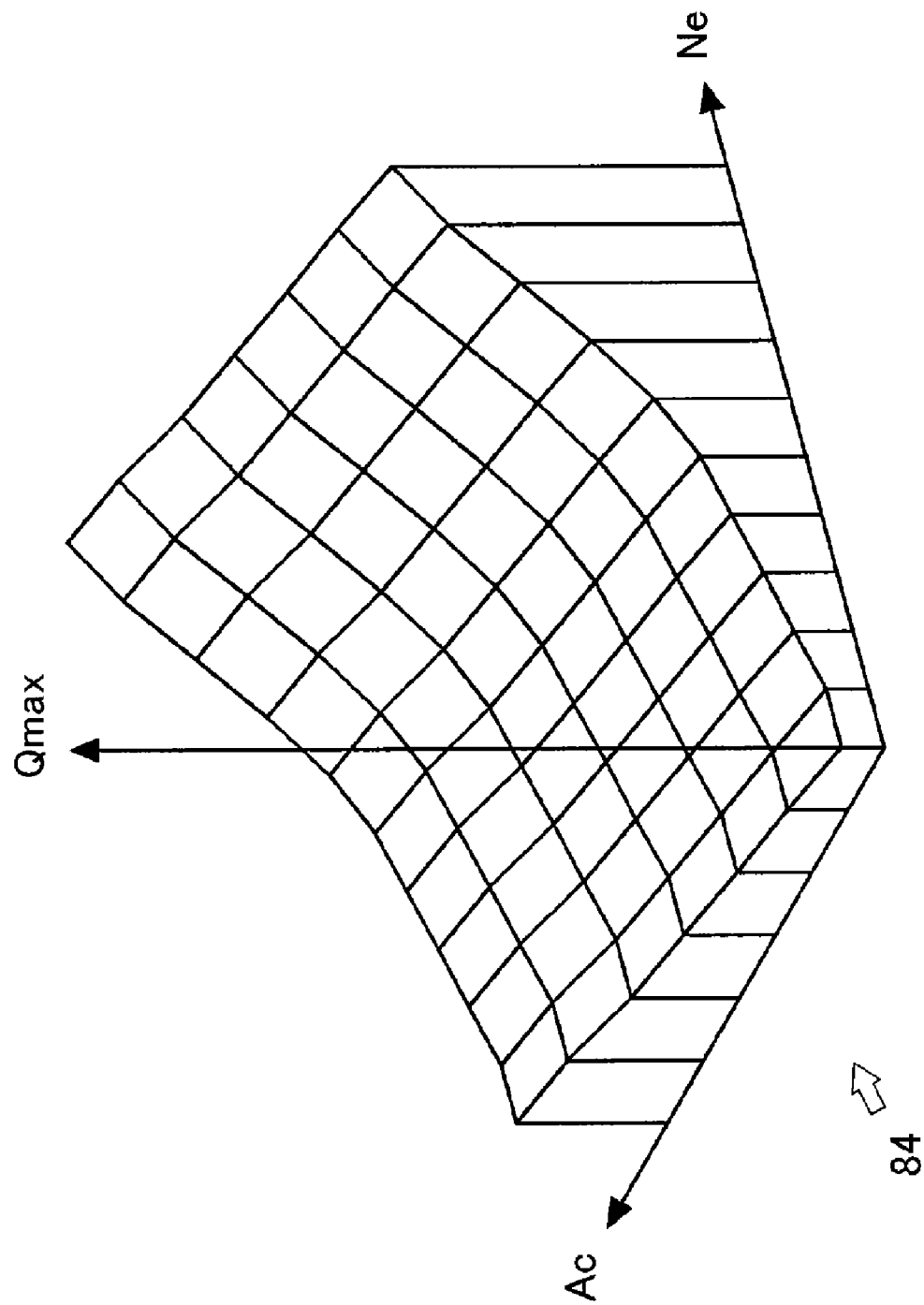
FIG. 10 is a maximum fuel injection amount map of the maximum fuel injection amount Qmax calculated based on rotation speed Ne and load Ac.
Figure 11:
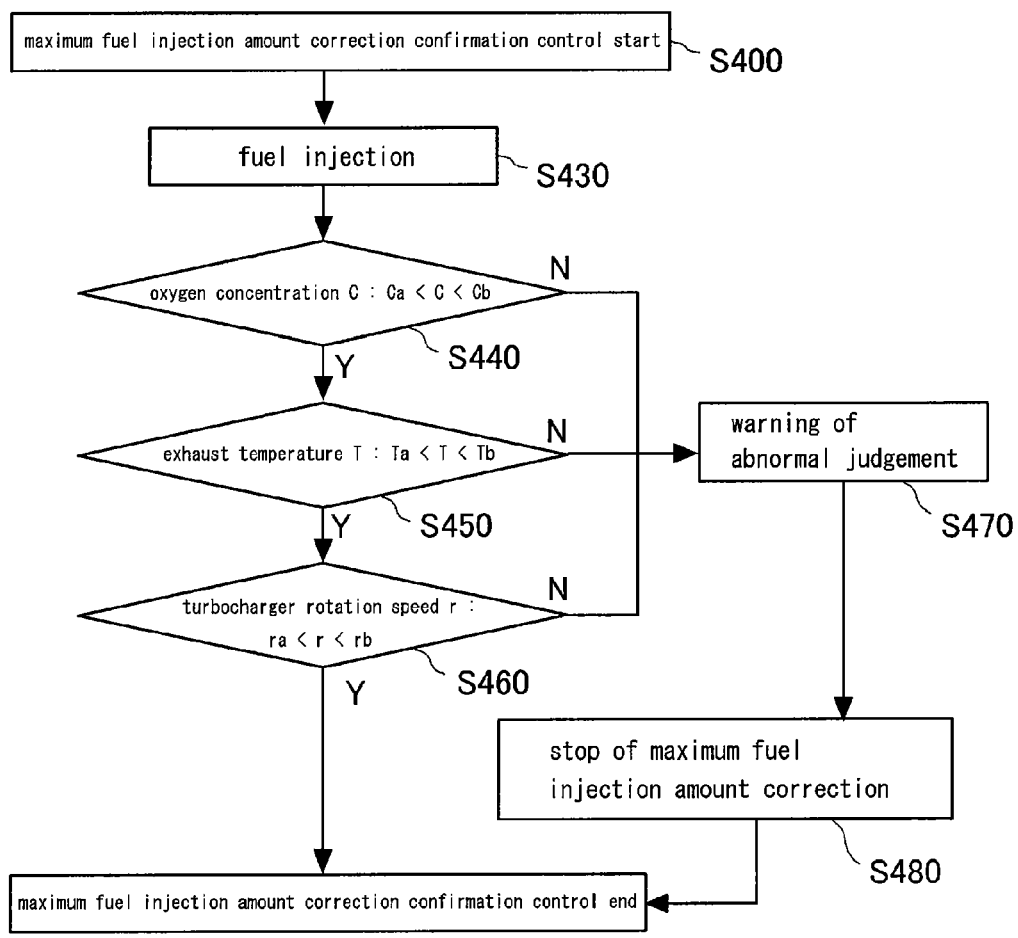
FIG. 11 is a flow chart of a flow of maximum fuel injection amount correction confirmation control.

FIG. 10 is a maximum fuel injection amount map of the maximum fuel injection amount Qmax calculated based on rotation speed Ne and load Ac. FIG. 11 is a flow chart of a flow of the maximum fuel injection amount correction confirmation control. FIG. 12(a) is a schematic drawing of the state in which the opening area of a nozzle of a VGT is large. FIG. 12(b) is a schematic drawing of the state in which the opening area of the nozzle is small.

Firstly, an explanation will be given on a 4-cylinder diesel engine having a common-rail fuel injection system as an embodiment of the present invention. Furthermore, an explanation will be given on a cetane number detection means using the angular velocity of engine rotation and the angular velocity amplitude of the engine rotation, the use being a feature of the present invention. Moreover, an explanation will be given on several fuel injection correction means of a common-rail fuel injection system to which the cetane number detection means is adopted.

With reference to FIG. 1, an explanation will be given on a common-rail fuel injection system 50 to which the cetane number detection means of the present invention is adopted.

For example, as shown in FIG. 4, the common-rail fuel injection system 50 injects fuel into a diesel engine 51 (hereinafter, simply referred to as an engine). The common-rail fuel injection system 50 mainly comprises a common rail 52 in which fuel is hydraulically accumulated, injectors 53a, 53b, 53c and 53d injecting fuel to cylinders, a supply pump 54 pressingly sending fuel with high pressure, and an engine control unit (hereinafter, referred to as an ECU) 70.

The common rail 52 stores high pressure fuel to be supplied to the injectors 53. The common rail 52 is connected through a fuel piping (high pressure fuel passage) 55 to a discharge port of the supply pump 54 so as to accumulate common rail pressure corresponding to fuel injection pressure.

Leak fuel from the injectors 53 returns to a fuel tank 57 through a leak piping (fuel return passage) 56. Fuel returning to the fuel tank 57 from the common rail 52 passes through a relief piping (fuel return passage) 58 via a pressure regulating valve 59. The pressure regulating valve 59 regulates returning fuel in the relief piping 58 so as to regulate the fuel pressure in the common rail 52 to the target fuel injection pressure.

Each of the injectors 53 is mounted in the cylinder of the engine 51 and injects and supplies fuel into the cylinder. The injectors 53 are connected to the ends of the downstream side of branch pipes branched from the common rail 52. Each of the injectors 53 is mounted therein with a fuel injection nozzle for injecting and supplying high pressure fuel hydraulically accumulated in the common rail 52 into the cylinder; an electromagnetic valve lifts and controls a needle housed in the fuel injection nozzle, and the like. The electromagnetic valve of the injector 53 controls the timing and the amount of the injection according to an injector opening signal given by the ECU 70. When the injector opening signal is given to the electromagnetic valve, high pressure fuel is injected and supplied into the cylinder, and when the injector opening signal is turned off, the fuel injection is stopped.

The supply pump 54 pressingly sends high pressure fuel to the common rail 52. The supply pump 54 is mounted therein with a feed pump sucking fuel in the fuel tank 57 into the supply pump 54 and a high pressure pump compresses the fuel sucked by the feed pump and pressingly sends the fuel to the common rail 52. The feed pump and the high pressure pump are driven by a common camshaft 60. The camshaft 60 is driven by a crankshaft 11 of the engine 51 or the like.

A supercharger 62 raises the pressure of the air so as to make the air be sucked into the engine compulsorily. The supercharger (turbocharger) 62 rotates a turbine (not shown) by using the pressure of the exhaust gas so as to raise the pressure of the air sucked into the engine 51. The supercharger 62 increases the mass (weight) of the sucked air so as to increase the fuel combusting (to make the fuel combust completely), thereby increasing the output of the engine 51. A λ sensor 74 detecting oxygen concentration and an exhaust temperature sensor 75 which is an exhaust temperature detection means are arranged in a passage and communicate the exhaust manifold of the supercharger 62 with the supercharger 62. A turbocharger rotation speed sensor 76 which is a turbocharger rotation speed detection means is provided in the vicinity of a rotation shaft of the turbine of the supercharger 62.

A VGT (Variable Geometry Turbocharger) 77 is constructed in the exhaust passage. The VGT 77 varies the opening area of the exhaust passage so as to vary the exhaust flow rate, that is, to vary the back pressure.

The ECU (Engine Control Unit) 70 comprises a CPU, RAM, ROM and the like; stores programs, maps and the like therein; and performs various arithmetic processes based on the read signals of the sensors. The ECU 70 serves as an arithmetic means and a correction means. The ECU 70 is connected thereto with an accelerator opening sensor 71 which detects accelerator opening as a means for detecting the state of the engine 51, that is, which is a rotation speed set means, a rotation speed sensor 72 detecting engine rotation speed, and a common rail pressure sensor 73 detecting common rail pressure. The ECU 70 is connected thereto with the λ sensor 74, the exhaust temperature sensor 75 and the turbocharger rotation speed sensor 76 so as to detect the state of the air system of the engine 51. Furthermore, the ECU 70 is connected thereto with an angular velocity sensor 10. Explanation will be given on the angular velocity sensor 10 in detail later.

The ECU 70 is connected with the injectors 53, the supply pump 54, the pressure regulating valve 59 and the VGT 77 and commands actuators thereof so as to control the engine 51.

With reference to FIG. 2, an explanation will be given on the angular velocity sensor 10, which measures engine rotation angular velocity.

As shown in FIG. 2, the angular velocity sensor 10 detects two signals from one pulse sensor 13. A pulsar 12 is fixed on the crankshaft 11 of the engine (not shown) and is rotated integrally therewith. Teeth (pulses) 12a are formed at fixed intervals on the perimeter of the pulsar 12. As the pulsar 12, a gear or a disk on which holes or slits are provided at intervals of fixed angles may alternatively be used. The pulse sensor 13 may be constructed by a proximity sensor, a magnetometric sensor, an optical sensor (photo interrupter) or the like.

The angular velocity sensor 10 is perpendicular to the crankshaft 11 so as to measure the pulses 12a outputted by the pulsar 12. A signal from the angular velocity sensor 10 is divided into two. One of the divided signals is outputted as the X axis, and the other is outputted through a F/V converter (frequency/voltage converter) 14 as the Y axis. According to this construction, the angular velocity sensor 10 outputs the engine rotation speed, that is, the crank angle θ (number of the pulses 12a) on the X axis regardless of time. On the other hand, the pulse number per time, that is, the angular velocity ω is outputted on the Y axis.

With regard to the present invention, the one angular velocity sensor 10 outputs the two signals (the crank angle θ and the crank angular velocity ω) so as to prevent measuring error between the two signals.

Next, with reference to FIG. 3, a detailed explanation will be given on the crank angle θ and the crank angular velocity ω.

FIG. 3 shows measurement results of the angular velocity sensor 10. The X axis as the axis of abscissas indicates the crank angle θ, and the Y axis as the axis of ordinates indicates the crank angular velocity ω. As shown in the diagram, the crank angular velocity ω shows a waveform amplitude against the crank angle θ.

The waveform amplitude in FIG. 3 shows a 4-cycle 4-cylinder diesel engine that has four explosions while the crankshaft 11 is rotated twice (for 720°). In the diagram, #1 indicates an explosion point of the first cylinder, and #2 indicates an explosion point of the second cylinder.

An alternation long and short dashed line at the center of the waveform amplitude indicates a mean value of the crank angular velocity ω, that is, an average of the engine rotation speed. An upper turning point indicates a BDC (Bottom Dead Center), and a lower turning point indicates a TDC (Top Dead Center). The crankshaft 11 goes from the TDC to the BDC while the angular velocity thereof is accelerated by the explosion, and subsequently goes from the BDC to the TDC while the angular velocity thereof is decelerated, and then the movement is repeated. It is known that the variation at the side of the TDC is determined by combustion so that the variation corresponds to a combustion characteristic, that is, cetane number.

Next, with reference to FIG. 4, an explanation will be given on angular velocity of high cetane number fuel and that of low cetane number fuel.

In FIG. 4, the axis of abscissas indicates the crank angle θ and the axis of ordinates indicates the crank angular velocity ω similarly to FIG. 3. The angular velocity ωa of high cetane number fuel and the angular velocity ωb of low cetane number fuel are indicated respectively by a solid line and a broken line. In FIG. 4, the angular velocities are compared with each other under the same engine state and injection condition (number, amount and timing). As shown in the graph, when the cetane number is decreased, the angular velocity is wholly decreased from ωa to ωb so that the angular velocity amplitude is increased from ωLa to ωLb. The cause thereof is that the decrease of the cetane number increases the ignition delay so that the timing of the combustion starting is delayed, whereby explosion power is not obtained.

In FIG. 4, the average of an angular velocity of low cetane number fuel, that is, an average angular velocity ωbm (broken line) is decreased against the average of an angular velocity a of high cetane number fuel, that is, an average angular velocity ωam (solid line). The decrease of the angular velocity following the decrease of the cetane number is known to be the characteristic in the vicinity of idling (low rotation and low load). The cause thereof is that the combustion efficiency is worsened and the explosion power, that is, the external work is decreased so that the decrease of the external work appears as the decrease of the average rotation speed when the injection amount is uniform.

Next, with reference to FIG. 5, an explanation will be given on the cetane number detection control. FIG. 5 is an angular velocity amplitude map 81 which is one of the maps stored in the ECU 70 previously. The angular velocity amplitude map 81 is a database which maps the appropriate angular velocity amplitude corresponding to the engine state to a digital value. The angular velocity amplitude map 81 calculates the appropriate angular velocity amplitude based on the engine state according to the rotation speed Ne and the injection amount Q of the engine 51.

The cetane number detection control compares the angular velocity amplitude map 81 with the actual angular velocity amplitude $\omega L1$ so as to confirm the variation of the cetane number. For example, as shown in FIG. 5, when the actual angular velocity amplitude $\omega L1$ is larger than the appropriate angular velocity amplitude at the same rotation speed Ne and injection amount Q as those of $\omega L1$ in the angular velocity amplitude map 81, the cetane number of the fuel is detected to be lower than the appropriate cetane number.

FIG. 6 is an average angular velocity map 82 which is one of the maps stored in the ECU 70 previously. The average angular velocity map 82 is a database which maps the appropriate average angular velocity corresponding to the engine state to a digital value. The average angular velocity map 82 calculates the appropriate average angular velocity based on the engine state according to the rotation speed Ne and the injection amount Q of the engine 51.

The cetane number detection control compares the average angular velocity map 82 with actual average angular velocity $\omega m1$ so as to confirm the variation of the cetane number. For example, as shown in FIG. 6, when the actual average angular velocity $\omega m1$ is smaller than the appropriate average angular velocity at the same rotation speed Ne and injection amount Q as those of $\omega L1$ in the average angular velocity map 82, the cetane number of the fuel is detected to be lower than the appropriate cetane number.

An explanation will be given on the fuel injection control of the common-rail fuel injection system 50 using the above cetane number detection control. FIG. 7 shows a flow chart of a main routine of the fuel injection control of the embodiment.

As shown in FIG. 7, with regard to the fuel injection control, the variation of the cetane number is detected by the cetane number detection control (S100); the fuel injection correction control or the multistage fuel injection correction control (S200) is performed following the variation of the cetane number; the maximum fuel injection amount correction control (S300) is performed which corrects the maximum fuel injection amount determined by the fuel injection correction control or the multistage fuel injection correction control; and the maximum fuel injection amount correction confirmation control (S400) is performed which confirms the reliability of the corrected maximum fuel injection amount.

The flow of the fuel injection control in the embodiment is an example and the control is not limited to the embodiment.

The fuel injection control in the embodiment can be performed regularly at the time of driving the engine 51. However, enough effect is obtained only by performing the control at the time of starting the engine 51 in consideration of the possibility of variation of the cetane number (for example, after supplying fuel).

Next, with reference to FIG. 8, an explanation will be given on the fuel injection correction control (S200). FIG. 8 is a fuel injection pressure map 83 which is one of the maps stored in the ECU 70 previously. The fuel injection pressure map 83 is a database which maps target fuel injection pressure Qp calculated based on the engine state according to the rotation speed Ne and the injection amount Q. The ECU 70 controls the opening and closing of the pressure regulating valve 59 so as to make the pressure in the common rail 52 the target fuel injection pressure Qp.

For example, when a decrease of the cetane number is detected by the cetane number detection control (S100), the ignitability of fuel in the engine 51 is worsened. Then, the ECU 70 corrects the fuel injection pressure map 83 stored previously so as to increase the target fuel injection pressure Qp. In the embodiment, the whole fuel injection pressure map 83 may be corrected or alternatively only an area of the prescribed load and rotation speed in the map may be corrected, and the method of the correction is not limited.

The fuel injection is performed according to the injection amount, the injection pressure or the number of the injection of the injectors 53. The ECU 70 stores therein these parameters as a database which maps the target value of the parameters with a digital value, the target value being calculated based on the engine state according to the rotation speed Ne and the injection amount Q.

Similar to the fuel injection pressure Qp, the calculated target value of fuel injection amount or the number of the fuel injection can be corrected based on the variation of the cetane number.

Accordingly, the parameters of the fuel injection (amount, pressure and number) can be corrected regularly against the variation of the cetane number so as to optimize the combustion. The variation of engine performance or exhaust emission influenced by the variation of the cetane number is minimized.

Next, with reference to FIG. 9, an explanation will be given on the multistage fuel injection correction control (S200). FIG. 9 is a graph of a combustion state of the multistage fuel injection. The axis of abscissas indicates time r and the axis of ordinates indicates injection amount Q. For example, with regard to the multistage fuel injection, three divided injections are performed. The pre injection Q1 generates a lean premixture, the pilot injection Q2 ignites and explodes the lean premixture, and the main injection Q3 performs the main combustion. The compression ignition of the premixture and the multistage combustion above brings a reduction of smoke and combustion noise.

The ECU 70 stores the target value of the fuel injection amount Q1, Q2 and Q3 and the fuel injection intervals $\tau 1$ and $\tau 2$ as a database which maps the target value to a digital value.

When a decrease of the cetane number is detected by the cetane number detection control (S100), the ignitability of the fuel is worsened. Then, a pre fuel injection map (not shown) is corrected so as to increase the fuel injection amount Q1, and a fuel injection interval (between the pilot injection and the main injection) map (not shown) is corrected so as to shorten the fuel injection interval $\tau 2$.

In the embodiment, the pre fuel injection map or the like may be corrected or alternatively only an area of the prescribed load and rotation speed in the map may be corrected, and the method of the correction is not limited. The correction of the target value of the fuel injection amount Q1, Q2 and Q3 and the fuel injection intervals $\tau 1$ and $\tau 2$ against the variation of the cetane number is not limited to the embodiment.

Accordingly, with regard to the engine 51 having a multistage injection means, the parameters of the fuel injection (amount, pressure and number) can be corrected regularly against the variation of the cetane number so as to optimize the combustion. The combustion noise or the increase of pressure in the cylinders influenced by the variation of the cetane number is minimized.

Next, with reference to FIG. 10 an explanation will be given on the maximum fuel injection amount correction control (S300). The maximum fuel injection amount is previously determined for each of the injectors 53a, 53b, 53c and 53d based on the engine state. The ECU 70 injects fuel of an amount in a tolerance of the maximum fuel injection amount Qmax based on the engine state according to the engine load Ac and the rotation speed Ne. A maximum fuel injection amount map 84 is a database which maps the maximum fuel injection amount based on the engine state according to engine load Ac and the rotation speed Ne to a digital value. When the fuel injection amount is corrected by the fuel injection correction control or the multistage fuel injection correction control, the maximum fuel injection amount map 84 is corrected following the correction of the fuel injection amount. Accordingly, when the cetane number is reduced, the output within the rated area is obtained.

When a variation of the cetane number is detected by the cetane number detection control, the maximum fuel injection amount map 84 is corrected following the variation of the cetane number.

Accordingly, when the cetane number is varied, the fuel injection is corrected certainly in all the load area. The rated output is guaranteed regardless of the effect of the variation of the cetane number.

Next, with reference to FIG. 11, an explanation will be given on the maximum fuel injection amount correction confirmation control (S400).

The maximum fuel injection amount correction confirmation control confirms the reliability of the maximum fuel injection amount Qmax corrected in the maximum fuel injection amount correction control (S300). With regard to the common-rail fuel injection system 50, the maximum fuel injection amount Qmax is adjusted appropriately at the time of production and has high reliability. Since the maximum fuel injection amount Qmax having high reliability is corrected in the maximum fuel injection amount correction control (S300), the reliability of the corrected value is confirmed again.

FIG. 11 shows a rough flow of the maximum fuel injection amount correction confirmation control (S400) which is an embodiment of the present invention. As shown in FIG. 11, the maximum fuel injection amount correction confirmation control confirms the reliability of the maximum fuel injection amount correction value using the oxygen concentration, exhaust temperature and turbocharger rotation speed.

The ECU 70 drives the engine at the corrected maximum fuel injection amount (S430) and confirms below characteristic values especially in the area of high rotation and high load.

The ECU 70 confirms whether the oxygen concentration C of the engine 51 into which fuel is injected with the corrected maximum fuel injection amount Qmax is within a predetermined range ($Ca<C<Cb$) or not (S440). When the concentration is within the predetermined range, the confirmation is judged to be normal. When the concentration is outside the predetermined range, the confirmation is judged to be abnormal and an operator is warned (S470).

The ECU 70 confirms whether the exhaust temperature T of the engine 51 into which fuel is injected with the corrected maximum fuel injection amount Qmax is within a predetermined range ($Ta<T<Tb$) or not (S450). When the concentration is within the predetermined range, the confirmation is judged to be normal. When the concentration is outside the predetermined range, the confirmation is judged to be abnormal and an operator is warned (S470).

The ECU 70 confirms whether the turbocharger rotation speed r of the engine 51 into which fuel is injected with the corrected maximum fuel injection amount Qmax is within a predetermined range ($ra<r<rb$) or not (S460). When the concentration is within the predetermined range, the confirmation is judged to be normal. When the concentration is outside the predetermined range, the confirmation is judged to be abnormal and an operator is warned (S470).

When the confirmation is judged to be abnormal (S470), the ECU 70 returns the corrected maximum fuel injection amount Qmax to the initial value (S480).

Anything that can be confirmed by an operator may be adopted as the warning means (S470) and the means is not limited in the embodiment. It is not necessary to judge the whole of S440, S450 and S460, and the judge may be omitted corresponding to the form of the engine to which the embodiment is adopted (for example, the engine 51 may not have the supercharger 62).

Figure 12:
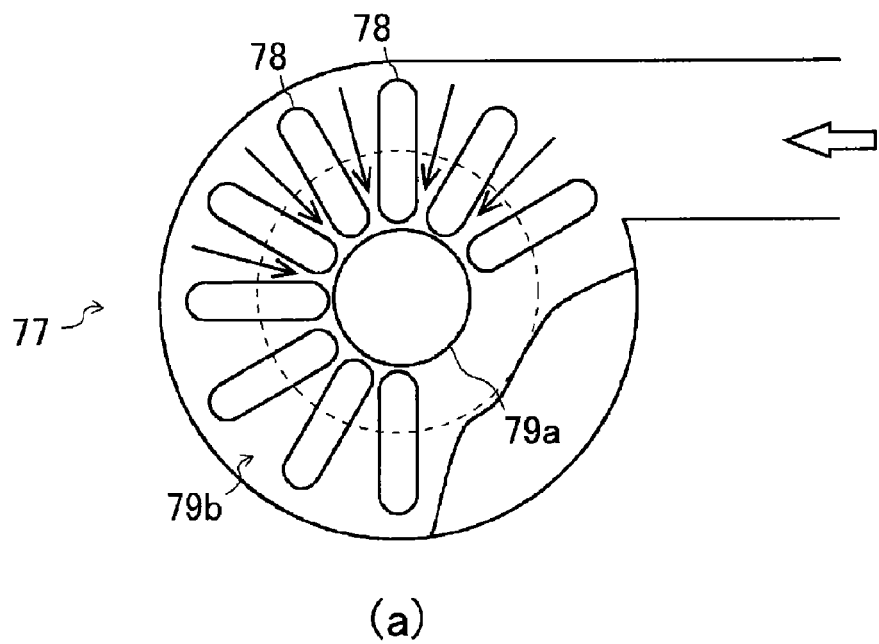
FIG. 12(a) is a schematic drawing of the state in which the opening area of a nozzle of a VGT is large. (b) is a schematic drawing of the state in which the opening area of the nozzle is small.
Figure 12:
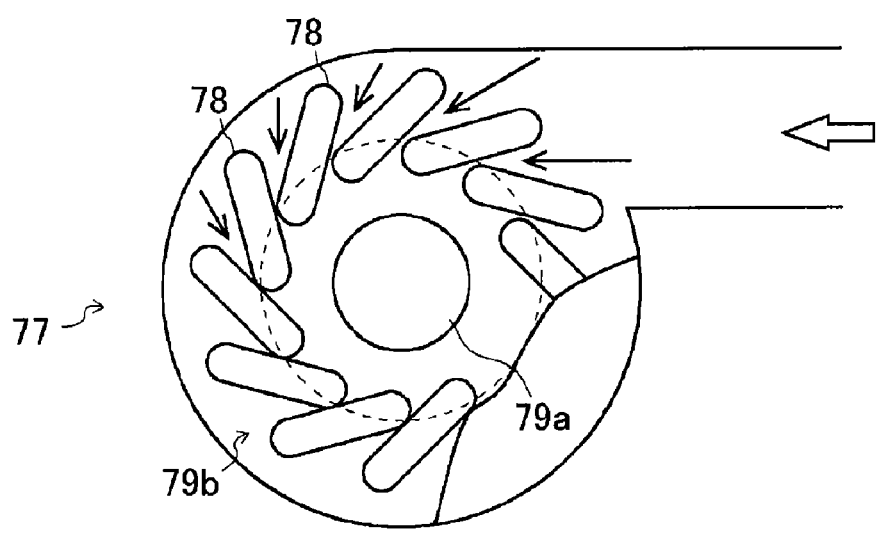

With reference to FIG. 12, an explanation will be given on the VGT 77 and the VGT control. As shown in FIG. 12(a), with regard to the VGT 77, a plurality of vanes 78 are provided in a turbine chamber 79b in which a turbine 79a is housed so as to surround the perimeter of the turbine chamber 79b. Each of the vanes 78 is slewed so as to vary the nozzle opening area of the exhaust passage.

The VGT control varies back pressure based on the variation of the cetane number detected by the cetane number detection control. When the cetane number detected by the cetane number detection control is decreased, each of the vanes 78 is positioned so as to turn along the peripheral direction as shown in FIG. 12(b), whereby the nozzle opening area is decreased and the back pressure is increased so as to reduce the exhaust flow rate.

Accordingly, when the cetane number is decreased and the ignitability of fuel is decreased, for example, the VGT 77 increases the back pressure at the time of starting the engine so as to improve the warming property of the engine 51, thereby improving the combustion.

INDUSTRIAL APPLICABILITY

The present invention is adoptable to a diesel engine of common rail type.

The invention claimed is:

1. A cetane number detection means characterized in that:
an angular velocity detection means detecting rotation angular velocity of a crankshaft of an engine is provided;
angular velocity amplitude which is a standard of judgment of cetane number is set based on engine rotation speed and fuel injection amount; and
variation of angular velocity amplitude obtained by the angular velocity detection means is compared with the standard value so as to detect variation of cetane number.

2. An engine comprising the cetane number detection means as set forth in claim 1, further comprising:
a load detection means detecting engine load;
an engine rotation speed detection means detecting engine rotation speed;
a fuel injection calculation means calculating at least one of fuel injection amount, number of fuel injection and fuel injection pressure about standard fuel based on the load detected by the load detection means and the rotation speed detected by the engine rotation speed detection means; and a fuel injection correction means correcting
the fuel injection amount when the fuel injection amount is calculated,
the number of fuel injection when the number of fuel injection is calculated, and
the fuel injection pressure when the fuel injection pressure is calculated,
based on the cetane number detected by the cetane number detection means.

3. The engine as set forth in claim 2, further comprising:
a multistage fuel injection means performing at least one injection before main injection;
a multistage fuel injection calculation means calculating at least one of injection timing or an injection interval of the multistage fuel injection means about the standard fuel; and
a multistage fuel injection correction means correcting
the fuel injection timing when the fuel injection timing is calculated, and
the fuel injection interval when the fuel injection interval is calculated,
based on the cetane number detected by the cetane number detection means.

4. The engine as set forth in claim 3, wherein the multistage fuel injection correction means shortens an interval between the main injection and injection just before the main injection when the cetane number detected by the cetane number detection means is decreased.

5. The engine as set forth in claim 3, wherein the correction by the fuel injection correction means or the multistage fuel injection correction means is performed at a time of starting the engine.

6. The engine as set forth in claim 2, further comprising:
a maximum fuel injection amount correction means correcting maximum fuel injection amount determined based on the fuel injection amount corrected by the fuel injection correction means or the cetane number detected by the cetane number detection means.

7. The engine as set forth in claim 2, further comprising:
a supercharger;
at least one of an oxygen concentration sensor, an exhaust temperature sensor and a turbocharger rotation speed sensor; and
a maximum fuel injection amount correction confirmation control means judges that maximum fuel injection amount corrected by the maximum fuel injection amount correction means is normal when oxygen concentration detected by the oxygen concentration sensor, exhaust temperature detected by the exhaust temperature sensor or turbocharger rotation speed detected by the turbocharger rotation speed sensor is within a predetermined threshold.

8. An engine comprising the cetane number detection means as set forth in claim 1, further comprising:
a variable capacity supercharger which can varies back pressure or supercharging pressure; and
a supercharging pressure control means controlling the back pressure or the supercharging pressure of the variable capacity supercharger based on the cetane number detected by the cetane number detection means.

9. The engine as set forth in claim 3, further comprising:
a supercharger;
at least one of an oxygen concentration sensor, an exhaust temperature sensor and a turbocharger rotation speed sensor; and
a maximum fuel injection amount correction confirmation control means judges that maximum fuel injection amount corrected by the maximum fuel injection amount correction means is normal when oxygen concentration detected by the oxygen concentration sensor, exhaust temperature detected by the exhaust temperature sensor or turbocharger rotation speed detected by the turbocharger rotation speed sensor is within a predetermined threshold.

10. The engine as set forth in claim 4, further comprising:
a supercharger;
at least one of an oxygen concentration sensor, an exhaust temperature sensor and a turbocharger rotation speed sensor; and
a maximum fuel injection amount correction confirmation control means judges that maximum fuel injection amount corrected by the maximum fuel injection amount correction means is normal when oxygen concentration detected by the oxygen concentration sensor, exhaust temperature detected by the exhaust temperature sensor or turbocharger rotation speed detected by the turbocharger rotation speed sensor is within a predetermined threshold.

11. The engine as set forth in claim 5, further comprising:
a supercharger;
at least one of an oxygen concentration sensor, an exhaust temperature sensor and a turbocharger rotation speed sensor; and
a maximum fuel injection amount correction confirmation control means judges that maximum fuel injection amount corrected by the maximum fuel injection amount correction means is normal when oxygen concentration detected by the oxygen concentration sensor, exhaust temperature detected by the exhaust temperature sensor or turbocharger rotation speed detected by the turbocharger rotation speed sensor is within a predetermined threshold.

12. The engine as set forth in claim 6, further comprising:
a supercharger;
at least one of an oxygen concentration sensor, an exhaust temperature sensor and a turbocharger rotation speed sensor; and
a maximum fuel injection amount correction confirmation control means judges that maximum fuel injection amount corrected by the maximum fuel injection amount correction means is normal when oxygen concentration detected by the oxygen concentration sensor, exhaust temperature detected by the exhaust temperature sensor or turbocharger rotation speed detected by the turbocharger rotation speed sensor is within a predetermined threshold.

\* \* \* \* \*